US006234400B1

(12) United States Patent
Guyer (10) Patent No.: US 6,234,400 B1
(45) Date of Patent: May 22, 2001

(54) SMALL SCALE COGENERATION SYSTEM FOR PRODUCING HEAT AND ELECTRICAL POWER

(75) Inventor: Eric C. Guyer, Dover, MA (US)

(73) Assignee: Yankee Scientific, Inc., Medfield, MA (US)

(*) Notice: Subject to any disclaimer, the term of this patent is extended or adjusted under 35 U.S.C. 154(b) by 0 days.

(21) Appl. No.: 09/490,744

(22) Filed: Jan. 27, 2000

Related U.S. Application Data

(63) Continuation-in-part of application No. 09/070,435, filed on Apr. 30, 1998, which is a continuation-in-part of application No. 09/007,262, filed on Jan. 14, 1998, now Pat. No. 5,918,805.

(51) Int. Cl.⁷ ...................................................... B60H 1/02
(52) U.S. Cl. ........................................................... 237/12.1
(58) Field of Search .............................. 237/13, 19, 9 R, 237/8 A, 2 R, 2 A, 12.1

(56) References Cited

U.S. PATENT DOCUMENTS

| 1,551,438 | 8/1925 | Staley . |
|---|---|---|
| 1,964,890 | 7/1934 | Neeson ................................. 257/246 |
| 2,130,894 | 9/1938 | Muir ...................................... 126/101 |
| 2,596,968 | 5/1952 | Harris et al. ............................ 60/105 |
| 2,822,136 | 2/1958 | Dalin ....................................... 237/17 |
| 2,827,893 | 3/1958 | Ribaudo et al. ...................... 126/101 |
| 2,833,268 | 5/1958 | Warren ................................. 126/101 |
| 3,198,190 | 8/1965 | Gordon ................................. 126/101 |
| 3,219,831 | 11/1965 | Ray et al. ................................ 290/2 |
| 3,393,515 | 7/1968 | Tabor et al. .............................. 60/64 |
| 3,913,331 | 10/1975 | Conwell ................................. 60/692 |
| 4,010,378 | 3/1977 | Tharpe et al. ............................ 290/2 |
| 4,061,131 | 12/1977 | Bohanon ............................... 126/271 |
| 4,124,178 | 11/1978 | Burke ..................................... 237/19 |
| 4,210,102 | 7/1980 | Dosmann ............................... 122/20 |
| 4,295,606 | * 10/1981 | Swenson ............................. 237/12.1 |
| 4,298,311 | 11/1981 | Ritzi ........................................ 415/80 |
| 4,344,569 | 8/1982 | Gardner ............................... 237/12.1 |
| 4,369,917 | 1/1983 | Schnell ................................ 237/12.1 |
| 4,418,538 | 12/1983 | Heinrich ................................. 60/646 |
| 4,437,308 | 3/1984 | Fischer ................................... 60/514 |
| 4,438,340 | * 3/1984 | Armiger ................................... 290/2 |

(List continued on next page.)

FOREIGN PATENT DOCUMENTS

| 2105494 | 8/1972 | (DE) . |
|---|---|---|
| 2544179 | 7/1976 | (DE) . |
| 7806508 | 1/1978 | (FR) . |
| 2001705 | 2/1979 | (GB) . |

*Primary Examiner*—Harold Joyce
*Assistant Examiner*—Derek S. Boles
(74) *Attorney, Agent, or Firm*—Cesari and McKenna, LLP (57) ABSTRACT

A small-scale, space-heating and electrical power co-generation system includes a heater and a pump for supplying high-pressure water to the heater. Within the heater, the high-pressure water is heated to at or near its saturation or boiling point so as to produce both vapor (e.g., steam) and liquid (e.g., water) fractions. This high pressure, two-phase mixture is then provided to an expander which expands the two-phase mixture to a lower pressure and, in the process, produces mechanical energy. The expander is coupled to an electrical generator so that the extracted mechanical energy can be used to drive the generator and thus produce electrical power. The fluid exiting the expander is then provided to a condenser. A space heating fluid (e.g., air or a separate water supply) is brought into proximity with the condenser so that it may be heated. This space heating fluid is then be distributed throughout the corresponding home or building for space heating purposes. Condensate exiting the condenser is returned to the pump, which is also powered by the generator, thereby completing the cycle of the working fluid. The electrical power generated by the system is not only sufficient to power the system itself, but excess electrical power is available for use within the corresponding home or building.

35 Claims, 5 Drawing Sheets

U.S. PATENT DOCUMENTS

| | | | |
|---|---|---|---|
| 4,474,018 | 10/1984 | Teagan | 62/79 |
| 4,768,495 | 9/1988 | Zifferer | 126/101 |
| 5,046,478 | 9/1991 | Clawson | 126/110 |
| 5,243,825 | 9/1993 | Lin | 62/238.7 |
| 5,544,645 | 8/1996 | Armijo et al. | 126/101 |
| 5,727,396 | 3/1998 | Boyd et al. | 62/323.1 |

\* cited by examiner

SMALL SCALE COGENERATION SYSTEM FOR PRODUCING HEAT AND ELECTRICAL POWER

This application is a continuation-in-part of application Ser. No. 09/070,435, filed Apr. 30, 1998, which is a continuation-in-part of application Ser. No. 09/007,262, filed Jan. 14, 1998, now U.S. Pat. No. 5,918,805.

This invention was made with U.S. Government support under Agreement No. DAAN02-98-3-0005 awarded by the Government. The U.S. Government has certain rights in the invention.

BACKGROUND OF THE INVENTION

1. Field of the Invention

The present invention relates generally to heating systems, and more specifically, to a small-scale cogeneration system for providing both heat and electrical power.

2. Background Information

Many commercial buildings as well as homes are heated by forced hot air furnaces. These furnaces typically include an oil or gas-fired burner, a heat exchanger, and an air blower or fan. The heat exchanger typically comprises a plurality of passageways through which hot combustion gases flow. The fan is mounted next to the heat exchanger such that cool air may be forced past the heat exchanger and heated. The fan, which is typically powered by an electric motor, also moves the heated air through the building or home via an arrangement of ducts leading to the various rooms. An electric thermostat operably connected to the burner and the fan is often used to control the furnace. The thermostat switches the furnace on (e.g., activates the burner and the fan) whenever the temperature at the thermostat falls below a preselected level. Operation of the furnace brings warm air into the home. When the temperature at the thermostat exceeds another preselected level, the thermostat shuts the furnace off, thereby suspending the flow of heated air.

One of the main disadvantages of such furnaces is their dependence on electricity. As described above, such furnaces generally include an electrically powered fan to move air past the heat exchanger and through the building or home being heated. In addition, electric power is often used to operate the thermostat and to control the burner. For a 100,000 British Thermal Units/hour (Btu/hr.) residential forced hot air furnace, for example, the electric power requirement is typically between 0.5 to 1.0 kilowatts. Annual electric power costs for operating such a furnace are in the range of $75 to $150. Furthermore, if the electricity delivered to the furnace is interrupted for whatever reason, the furnace is rendered inoperable. That is, without electric power, the thermostat, the burner and the motor that drives the fan will not work, thereby stopping the flow of warm air to the space(s) being heated.

Electric power, moreover, is often lost in blizzards or other cold weather storms. The concomitant loss of the furnace's heating ability, during such periods when the demands for heat are large, can have serious consequences. For example, if the power is disrupted for any length of time, the building or home can become so cold as to be uninhabitable. In addition, the temperature in the building or home may fall below freezing, causing water pipes to burst. The resulting water damage can be substantial.

In addition, large-scale steam-powered stations for generating both electric power and heat are known. Many centralized power production facilities, for example, burn coal or oil to generate high pressure/high temperature steam which, in turn, is used to run one or more generators for providing several megawatts of electrical power. This power may then be supplied to a public power grid or within a campus of buildings. The high pressure/high temperature steam may also be used for space heating purposes. That is, remaining heat energy from the steam, after powering the electric generator(s), may also be provided to neighboring buildings. The steam may then be used for space heating purposes within the buildings.

These large-scale systems (i.e., on the order of several megawatts) typically operate on the well-known Rankine steam cycle. To achieve acceptable fuel efficiency levels, steam boilers producing steam at high pressures (e.g., over 500 pounds per square inch) are required. These boilers typically include a relatively large free surface area for separating the vapor phase (i.e., steam) from the liquid phase (i.e., water), and generating a large inventory of high pressure, high temperature water within the boiler. In addition, complex control systems and heavy wall construction boilers are needed to safely manage the steam. Accordingly, the resulting systems are typically quite large in size and demand constant supervision to ensure safe operation. Indeed, an explosion at theses pressures and temperatures can be catastrophic.

Although these systems are adequate for large-scale operation, they are not suitable for use in most residential or small commercial buildings where the electric power requirements are on the order of 1 to 20 kilowatts. First, the need for a large vapor/liquid surface area, large water inventories, and boilers capable of withstanding the high steam pressures and temperatures demands a system far too large and expensive for practical small-scale installations. The American Society of Mechanical Engineers (ASME) code, moreover, prohibits the practical installation of steam boilers operating at these high pressures in residential settings. Additionally, owners of such systems would be unwilling to provide the needed supervision to ensure safe operation. Indeed, there is no system presently available for providing safe and economical delivery of electrical power and heat on a small-scale (i.e., on the order of 2 to 20 kilowatts) using a high pressure steam boiler. Furthermore, no other means of routinely generating both heat and electrical power on a small-scale, such as internal combustion engines, has been widely adopted due to cost and operating difficulties.

SUMMARY OF THE INVENTION

Briefly, the invention relates to a small-scale, space-heating and electrical power co-generation system that is most advantageously used in homes and small commercial buildings. The system includes a heater and a pump for supplying high-pressure water to the heater. Within the heater, the high-pressure water is heated to near its saturation or boiling point so as to include both vapor (e.g., steam) and liquid (e.g., water) fractions. This high pressure, two-phase mixture is then provided to an expander which expands the two-phase mixture to a lower pressure and, in the process, produces mechanical energy. The expander is coupled to an electrical generator so that the mechanical energy extracted from the two-phase mixture can be used to drive the generator, and thus produce electrical power. The two-phase mixture exiting the expander, which is now at a lower pressure due to the expansion process and consists of a larger vapor fraction, is then provided to a condenser. A space heating fluid (e.g., air or a separate water supply) is brought into proximity with the condenser so that it may be heated as the water vapor condenses. This space heating fluid can then be distributed throughout the corresponding home or building for space heating purposes, using the electrical power generated by the system. Condensate exiting the condenser is returned to the pump, which is also powered by the generator, thereby completing the cycle. Excess electrical power is also available to the home or building.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
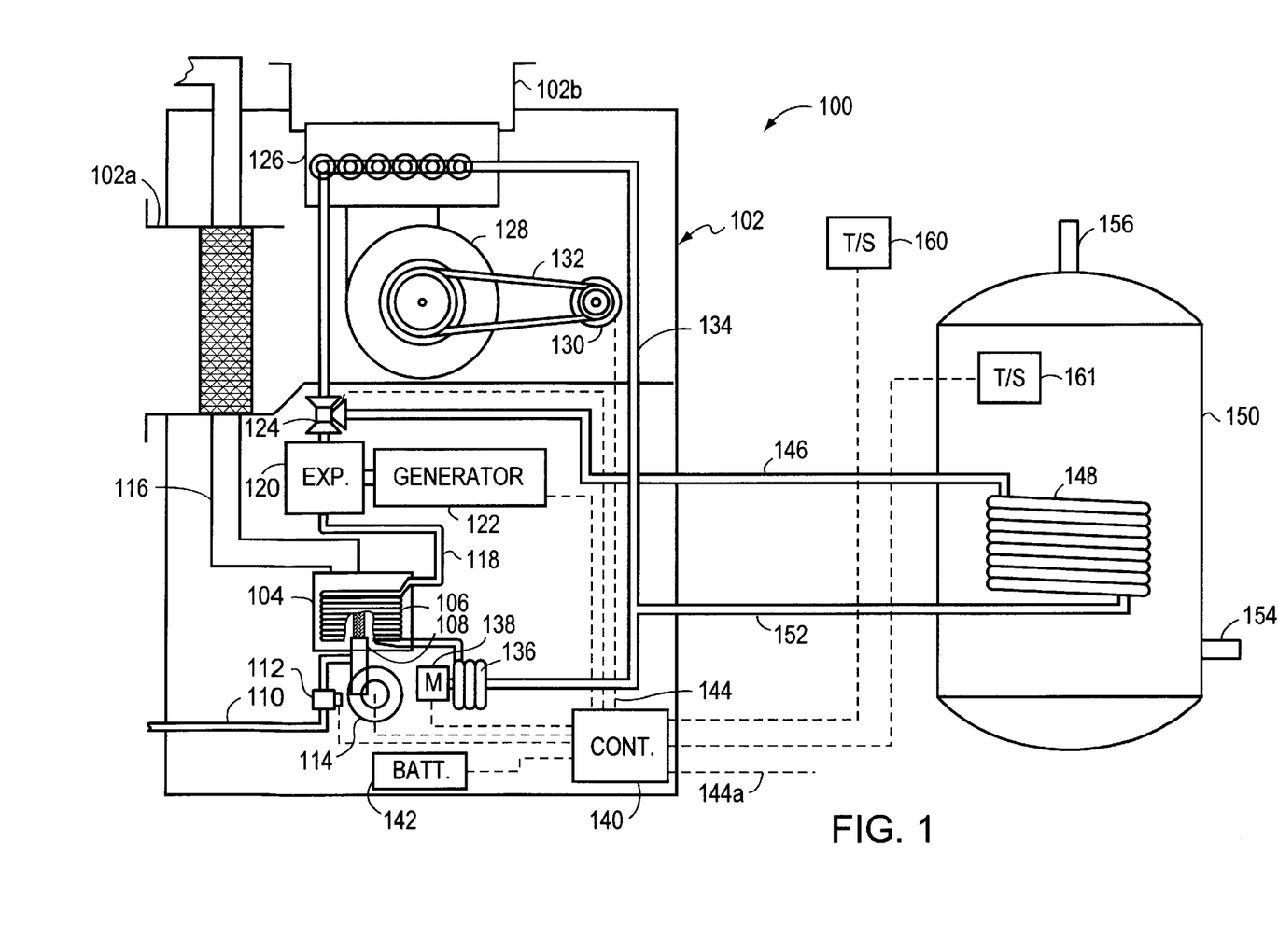
FIG. 1 is a block diagram of a small-scale co-generation system for providing heat and electrical power in accordance with the present invention.

FIG. 1 is a block diagram of a small-scale cogeneration system 100 in accordance with the present invention. The cogeneration system 100 includes a high pressure heater 104. Disposed within the heater 104 is a heating element 106 through which a working fluid, such as water, flows at high pressure. Heating element 106 is preferably formed from a small diameter, monotube, helical coil having fins to improve heat transfer, thus having a low total mass and containing a relatively small volume of water. For example, for a 100,000 Btu/hr. system 100, heating element 106 may have an internal diameter of approximately 0.25 inches. As described, the design of heater 104 provides for near instantaneous heating of the water as it rapidly passes through the heating element 106. A burner 108 extends at least partially into the heater 104. Burner 108 preferably operates on a gaseous hydrocarbon fuel which may be provided by a gas line 110 and regulated by a fuel valve 112. Combustion air may be provided under pressure to burner 108 by a combustion air fan 114 which also forces combustion gases through the heater 104 and into an exhaust stack 116. It should be understood that the burner 108 may also operate under natural draft conditions.

Heating element 106 of heater 104 is preferably connected to an expander 120 by means of a supply line 118 so that high pressure, hot working fluid may flow from element 106 to the expander 120. The expander 120, in turn, is operably coupled to a generator 122. Expanded fluid (e.g., a mixture of hot water and steam) exiting the expander 120 preferably passes through a three-way valve 124 and is delivered to a condenser 126. A central air blower 128 is preferably disposed adjacent to the condenser 126. The heater 104, expander 120, generator 122, condenser 126 and blower 128 are all preferably mounted within a housing 102 having an air inlet 102a and an air outlet 102b. In particular, the central air blower 128 and the condenser 126 are preferably arranged within the housing 102 so that the blower 128 may draw cool room air into the housing 102 via air inlet 102a and force it past the heat exchanger 126 and out the air outlet 102b. The air outlet 102b, moreover, is preferably connected to an arrangement of ducts (not shown) which lead to one or more of the various rooms of the space being heated. The central air blower 128 may be powered by an electric motor 130 which is operably coupled thereto (e.g., by endless belt 132).

A return line 134 connects the condenser 126 to the heater 104 so that condensate exiting the condenser 126 may be returned to the water heater 104. A high-pressure pump 136, preferably disposed within the return line 134, maintains the water in the heater 104 at a high pressure, (e.g., in excess of 100 pounds per square inch atmospheric (psia). The pump 136 is preferably powered by an electric pump motor 138. The cogeneration system 100 further includes a controller 140 that is coupled to the generator 122 for receiving electrical power therefrom. Controller 140 is preferably coupled to a thermostat 160 disposed in the space being heated. The controller 140 is also operatively connected to the valve 124, electric motor 138, combustion air fan 114, fuel valve 112, air blower electric motor 130, the thermostat 160, pump motor 138 and a battery 142, as shown by dashed lines 144. As described below, controller 140 governs the operation of the cogeneration system 100 and provides supplemental electric power to the corresponding home or building or to a utility grid via electric outlet line 144a.

In response to a call for heat from the thermostat, the controller 140 activates the combustion fan 114 and the pump 138 and opens the fuel valve 112. To perform these functions, controller 140 may utilize a small amount of power from the electric utility grid via line 144a. If electric power is unavailable (e.g., during a power outage), controller 140 may utilize electric power stored in the battery 142 to start the system 100. Fuel entering the burner 108 is ignited thereby heating the high pressure fluid (e.g., water) disposed in the heating element 106 within heater 104. Burner 108, combustion fan 114 and heater 104 are all preferably configured so as to heat the water in element 106 to a temperature at or near the boiling point for the corresponding operating pressure (e.g., 467° F. at 500 psia for water).

The hot, high-pressure fluid exiting the heater 104 preferably includes both a vapor fraction (e.g., steam) and a liquid fraction (e.g., water). The vapor fraction of the fluid may be within the range of approximately 0–90%. More specifically, the vapor fraction may be within the range of approximately 20–80%, and is preferably within the range 50–70%. That is, the working fluid exiting the heater 104 is a two-phase mixture. This two-phase mixture exits the heater 104 at supply line 118 and enters the expander 120 which extracts mechanical energy from the high-pressure, two-phase mixture, reducing its pressure (e.g., to 7 psia) and causing at least a portion of the liquid fraction to e flashed to steam. Mechanical energy extracted by expander 120 is used to drive the generator 122. That is, the expander 120 is preferably coupled to the generator 122 by suitable means (e.g., a drive shaft, belt, etc.) so as to run the generator 122. Operation of the generator 122 by the expander 120 results in a supply of electrical power which is provided to the controller 140. Once the controller 140 begins to receive electrical power from the generator 122, it no longer needs to rely on the electric utility grid or the battery 142 to operate the system 100.

The hot working fluid exiting the expander 120, which typically has a higher vapor fraction and lower pressure due to the expansion process, is then provided to the condenser 126 and is condensed in order to heat room air being forced past the condenser 126 by the blower 128. In particular, the controller 140, utilizing electric power from generator 122, activates the blower motor 130 which, in turn, runs the blower 128. Operation of the blower 128 draws room air into the air inlet 102a and forces it past the heat exchanger 126 heating it. Warm room air is then distributed throughout the space being heated by the ducts coupled to the air outlet 102b. Condensate exiting the heat exchanger 126 flows back to the heater 104 via return line 134. Pump 136 preferably maintains the flow of the working fluid within the heater 104 at the desired value (e.g., 200 psia).

The expander 120 can be of a positive displacement or turbo-dynamic device design for converting high pressure, hot water to mechanical power, such as a rotary vane expander similar to that described in U.S. Pat. No. 4,437,308 entitled Rotary Heat Engine, the specification of which is hereby incorporated by reference in its entirety, a rotary screw expander, or a turbine similar to that described in U.S. Pat. No. 4,298,311 entitled Two-Phase Reaction Turbine the specification of which is hereby incorporated by reference in its entirety. Since, in addition to receiving a two-phase working fluid (e.g., water and steam), a portion of the liquid phase of the working fluid will flash to steam during expansion, the expander should be capable of operating under such two-phase fluid flow conditions.

In the preferred embodiment, expander 120 is a an oil-free, scroll-type expander. A scroll expander basically includes a set of involute spiral vanes that mesh to form a plurality of crescent-shaped chambers between them. One of the spiral vanes orbits about the other which remains stationary. As the orbiting vane spins, the crescent-shaped chambers become larger and larger allowing the fluid flowing through the expander to expand. A scroll-type expander is preferred, in part, because of its ability to operate across a wide range of liquid/vapor mixtures, the absence of any inlet or outlet valves (thereby reducing complexity), its ability to operate at speeds appropriate for the production of electric power, its ability to initiate rotation of the generator without external assistance other than the pumped flow of liquid fluid (i.e., it is self-starting), and the beneficial effect that the liquid fraction can have on sealing the clearances between the fixed and orbiting vanes.

Figure 2:
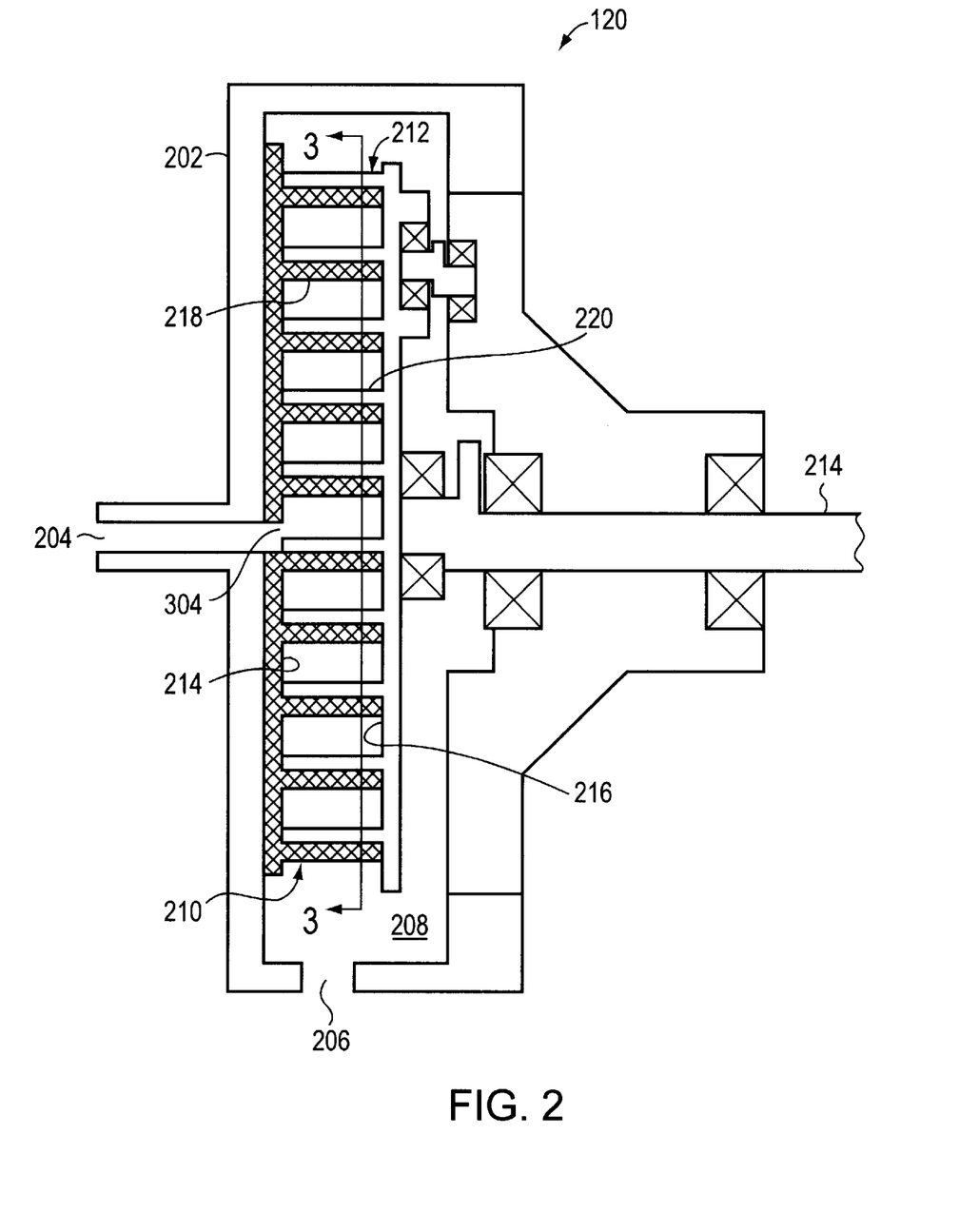
FIG. 2 is a cross-sectional side view of the expander of the co-generation system of FIG. 1.

FIG. 2 is a cross-sectional, side elevation of a preferred scroll-type expander 120 for use with the present invention. Expander 120 includes an outer housing 202 having an inlet 204 for receiving the hot, high-pressure working fluid and an outlet 206 for discharging the expanded working fluid. The outer housing 202 defines an inner space 208 in which a stationary scroll 210 and an orbiting scroll 212 are disposed. Each scroll 210, 212 includes a base 214, 216 and a spiral-shaped vane 218, 220 that is mounted to and extends from its corresponding base 214, 216. The orbiting scroll 212 is mounted to an output shaft 214, which is supported within and extends from the housing 202 through a series of bearings.

Figure 3:
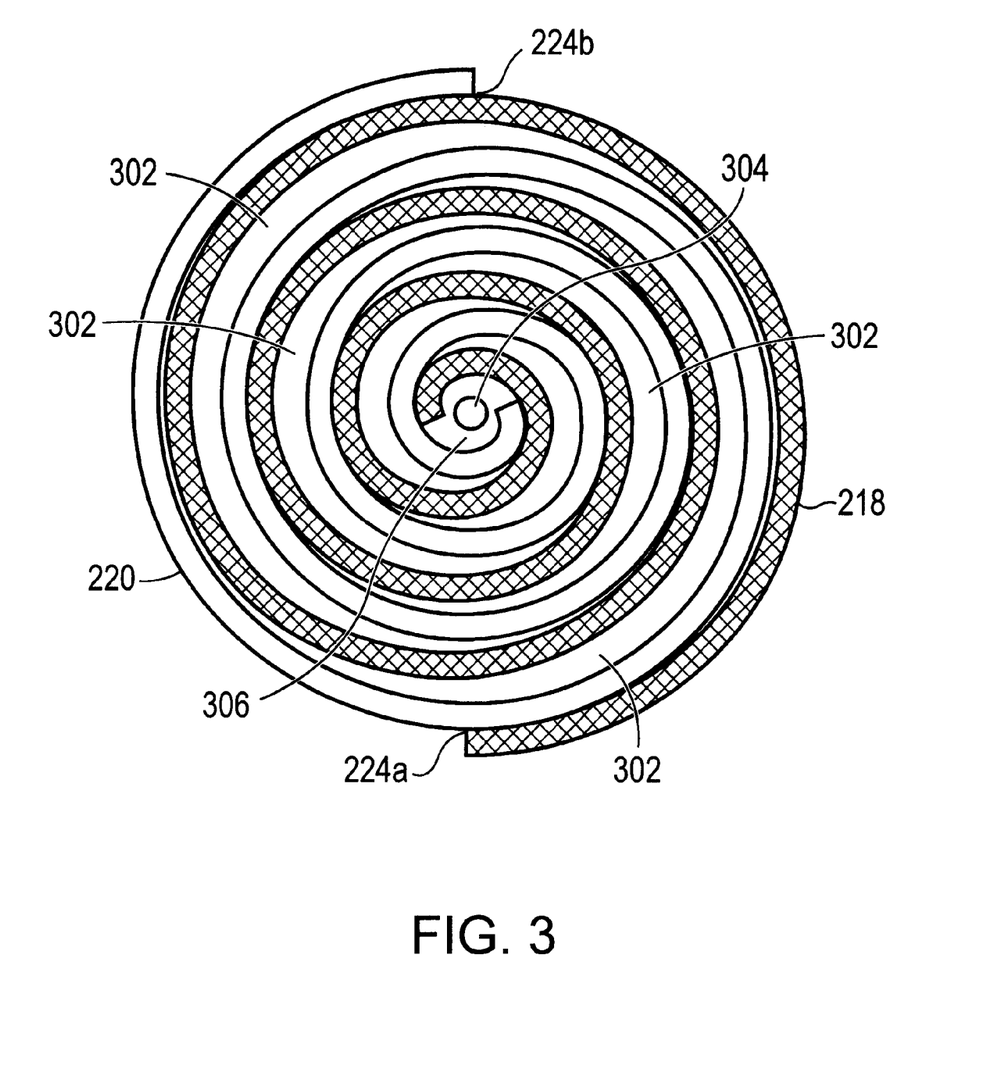
FIG. 3 is a partial front view of the expander of FIG. 2.

FIG. 3 is a partial front view of the two scrolls 210, 212 of the expander 120 along lines 3—3. As shown in FIG. 3, the spiral-shaped vanes 218, 220 of the two scrolls 210, 212 are meshed so as to define a plurality of crescent-shaped chambers 302. The base 214 (FIG. 2) of stationary scroll 210 includes an inlet port 304 for delivering the high-pressure working fluid received from the inlet 204 (FIG. 2) of the expander 120 into a central chamber 306 of the expander 120. At their outer peripheries, the two spiral-shaped vanes 218, 220 define corresponding discharge points 224a and 224b, as scroll 212 obits about scroll 210.

During operation, the hot, high-pressure mixture enters the scrolls 210, 212 at inlet 304. Due to the pressure differential across the vanes (e.g., between inner and outer crescent-shaped chambers), the free scroll 212 is driven in orbital motion relative to the stationary scroll 210. The orbital motion rotates a crank on the output shaft 214 in order to deliver useful mechanical power to the generator 122. The expanded working fluid exhausts from between the fixed and orbiting scrolls 210, 212 at discharge points 224a, 224b.

The scroll expander is preferably configured to operate without the need for oil in contact with the expanding working fluid by use of self-lubricating bearing materials that may be immersed in the working fluid or by use of a design that places all bearings outside the spaces in direct contact with the working fluid. In either of these designs, the sealing of the working fluid from the ambient atmosphere along the periphery the fixed and orbiting scrolls can be such that any small of amounts of working fluid leakage from the scroll expander 120 to the ambient atmosphere can easily be accommodated, and will not significantly degrade the performance or reliability of the system 100.

Pump 138 (FIG. 1) is preferably a positive-displacement pump, meaning that it displaces a known quantity of liquid (e.g., water) with each pump revolution. When coupled to an electric motor of sufficient power, positive-displacement pumps provide a continuous flow of fluid that is largely independent of the differential pressure across the pump (e.g., between its inlet and outlet).

As shown, cogeneration system 100 is capable of supplying both heat and electric power on a small-scale (e.g., on the order of 1 to 20 kilowatts). In other words, by utilizing high pressure, hot water, system 100 is able to generate excess electrical power beyond the needs of the electrical components included therein. This excess electrical power may be utilized by the corresponding home or building and/or supplied to the corresponding electrical power grid. To improve efficiency, a portion of the exhaust stack 116 may be positioned proximate to the air inlet 102a so as to preheat the room air entering the heating system 100. The controller 140, moreover, may be configured to recharge the battery 142 while electrical power is being supplied by the generator 122.

The cogeneration system 100 may also be configured to heat a domestic supply of water with a portion of the hot water and steam exiting the expander 120. In particular, a feed pipe 146 may be connected to the valve 124 so as to divert some or all of the working fluid exiting the expander 120 to a heating coil 148 disposed in a hot water tank 150. A return pipe 152 transfers condensate exiting the heating coil 148 to the return line 134. Water to be heated is provided to the tank 150 via an inlet 154. As water in the tank 150 flows around the coil 148, it is heated. Hot water may then be drawn out of the tank 150 via an outlet 156. The valve 124, which may be electrically activated, preferably adjusts the flow of working fluid being provided to the coil 148 under the command of controller 140 and in response to a water heating thermostat 161.

It should be understood that, for a given pressure, the efficiency with which mechanical energy may be extracted from "saturated", "dry" or "superheated" steam is greater than the efficiency with which mechanical energy may be extracted from hot water or two-phase mixtures of hot water and steam. As described above, however, a cogeneration system utilizing high pressure steam (e.g., above 100 psia) would be extremely expensive and present significant risk of injury should a failure occur. Nonetheless, the efficiency with which mechanical energy can be extracted from high pressure, hot water and mixtures of hot water and steam is sufficient for operating a small-scale cogeneration system. For example, the theoretical thermodynamic efficiency of a two phase (50% water and 50% steam) system having a 200 psia heater and a 15 psia heat condenser is 90% of the efficiency of a saturated steam cycle system operating at the same pressures. Accordingly, a high pressure, two-phase system, as described herein, although slightly less efficient than a steam cycle system can be economically designed and manufactured and is far safer to operate than high pressure steam systems, which typically operate only with saturated or superheated steam.

Figure 4:
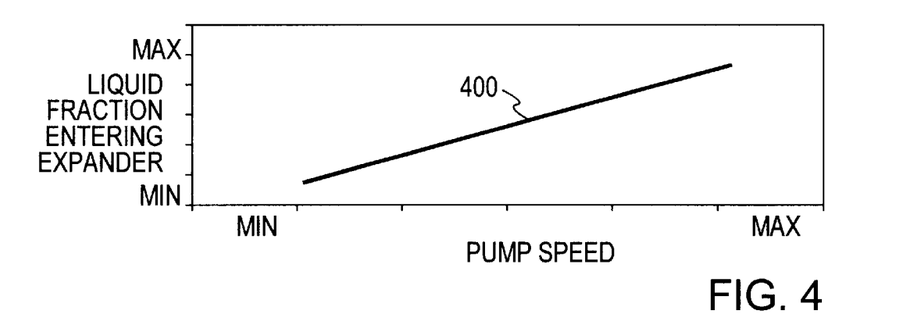
FIGS. 4–7 are plots illustrating the operating characteristics of the co-generation system of FIG. 1 as a function of pump speed.

One of the primary advantages of the present invention is that substantially instantaneous control over the co-generation system 100 can be achieved by simply adjusting the operating speed of pump 136 via pump motor 138. FIGS. 4–7 are highly schematic plots of various operating characteristics of the co-generation system 100 as a function of pump speed. FIG. 4, for example, is a plot 400 of the percentage of liquid fraction of the working fluid entering the expander 120 as a function of pump speed. As shown by plot 400, as pump speed (and thus fluid mass flow rate through the heater 104) is increased, the liquid fraction of the working fluid entering the expander 120 similarly increases. This is due to the fact that, as pump speed is increased, the rate (mass per unit time) at which the working fluid flows through the heater 104 also increases, thereby reducing the amount of heat energy that is being transferred to a given mass of working fluid as it flows through the heater, assuming a constant burn rate of burner 108. Accordingly, there is less heat energy available to convert the given mass of working fluid into its vapor phase.

Figure 5:
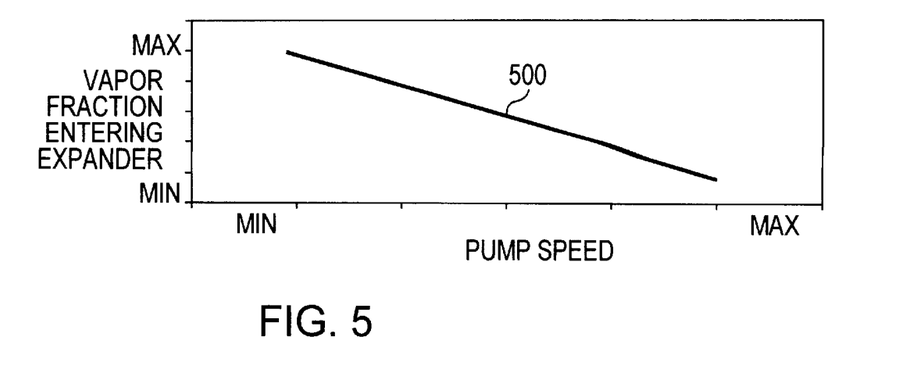
Figure 6:
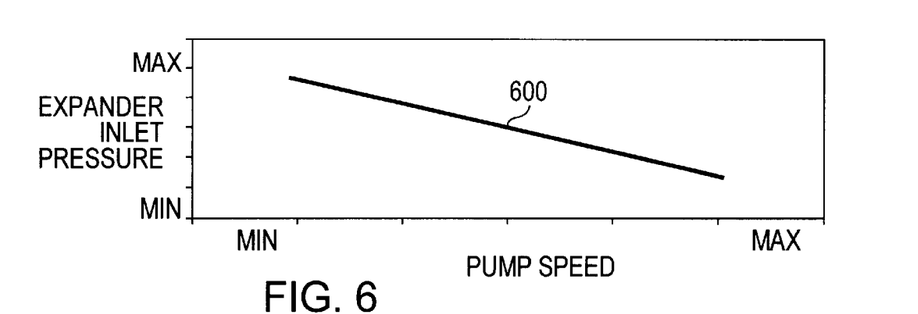

FIG. 5 is a plot 500 of the percentage of vapor fraction of the working fluid entering the expander 120 as a function of pump speed. As shown by plot 500, as pump speed (and thus liquid mass flow rate through the heater 104) is decreased, the vapor fraction of the working fluid entering the expander 120 increases. That is, by slowing the pump speed, the rate at which the working fluid flows through the heater 104 is also slowed, allowing more heat energy to be absorbed by a given volume of the working fluid for causing a phase change (i.e., increasing the vapor fraction). FIG. 6 is a plot 600 of the pressure of the two-phase working fluid entering the expander as a finction of pump speed. As shown by plot 600, as pump speed is increased, the pressure of the two-phase working fluid entering the expander decreases.

The pressure of the working fluid entering expander 120 is primarily controlled and regulated by the speed of the pump 136, and the resulting relative fractions of liquid water and water vapor exiting the heating element 106. By slowing pump 136, the controller 140 causes an increased vapor fraction of vapor exiting the heating element 106. With the expander 120 having either a fixed nozzle, as in a turbine, or a fixed volumetric displacement rate, the increased vapor fraction causes an increase in the equilibrium pressure established between the pump 136 and the expander 120. This increased pressure is a necessary consequence of the fact that the pump 136 preferably provides a near constant rate of mass flow of working fluid through the system 100, and thus constant mass flow to the expander 120. With the lower average fluid density and increased volumetric flow through a fixed nozzle or a fixed displacement fluid expander, the flow through the expander 120 can only be sustained by an offsetting increased inlet pressure. This increased pressure provides the capacity to maintain the constant rate mass flow through the flow resistance posed by the expander 120. Increased inlet pressure at expander 120 resulting from decreased pump speed, moreover, results in an increased torque and/or speed from the expander 120, and thereby increased electric power generation capability. Conversely, an increase in the speed of the pump 136 will cause a reduction in the vapor fraction exiting the heating element 106 and a decrease in the equilibrium pressure established between the pump 136 and the expander 120. A lower equilibrium pressure results in reduced power generation capacity by expander 120, and thus less electric power output from generator 122. Testing of an actual system embodying the elements of this invention demonstrates that the mechanical power generating response of the expander 120 to changes in pump speed is nearly instantaneous, and provides a practical way of controlling the electric power generating capacity of system 100.

Figure 7:
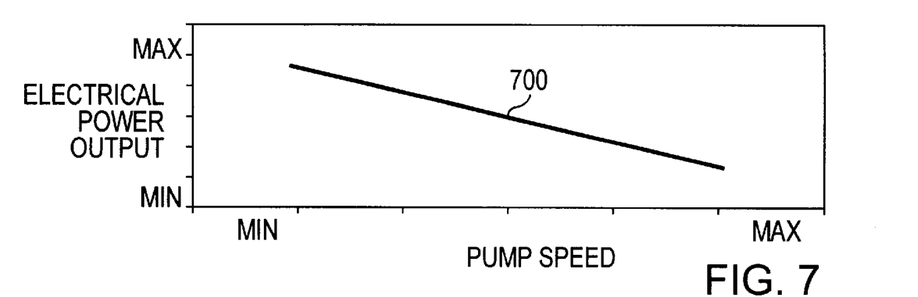

FIG. 7 is a plot 700 of the electrical power output of the generator 122 as powered by the expander 120 as a function of pump speed. As shown by plot 700, by simply adjusting the speed of pump 136, the electrical power generated by the system 100 can be quickly and easily controlled. More specifically, as pump speed is increased, electrical power output is decreased and, as pump speed is reduced, electrical power output is increased. Higher pump speed reduces expander output (torque and/or speed) and thus reduces electrical power output of the generator 122, because the diminished vapor fraction of the working fluid entering the expander 120, as shown by plot 500 of FIG. 5, reduces the expander inlet pressure, as shown by plot 600 of FIG. 6.

Controlling the expander output power (and thus electric power generation) through regulation of the pump speed provides a practical and convenient means of controlling the output of the system 100. For example, no valves, pressure controls or other similar devices are required to regulate the power produced by the expander 120. Control of the electrical output of the system 100 by adjusting the pump speed also avoids having to change the fuel-burning rate of the burner 108 in order to control electric power production, and thus generally leaves the heat production rate of the system 100 un-changed, despite changes in electrical power output. Furthermore, with a burner 108 capable of different firing capacities (e.g., two-stage or fully modulating burner), independent control, within thermodynamic limits, of the electric power production rate and the heat generation rate of system 100 can be obtained.

The invention's independent control of heat and electric power production may best be illustrated by example. Suppose that the design performance of such a system is 100,000 Btu/hr. heating capacity and 2 kilowatts (kW) of electric power with the pump speed yielding a mixture of 75% saturated water and 25% saturated steam at the inlet of expander 120. In response to a reduced heating demand, the firing rate of the burner 108 may be lowered to 70,000 Btu/hr. as in a two-stage burner. However, if desired, the electrical output of the system 100 can be maintained by a more than proportional decrease in the pump speed. Such a speed decrease will tend to sustain both the vapor flow into the expander 120 and the equilibrium pressure established between the heater 104 and the expander 120. Thus, electrical power generating capacity can be sustained in spite of reduced heat production rate. The same system can also vary the electrical power output while maintaining the heating capacity, as previously described, by lowering the pump speed (to increase steam flow, equilibrium pressure, and expander power output) or increasing pump speed (to decrease steam flow, equilibrium pressure and expander power output.

In addition, operating heating element 106 with a two-phase mixture, including some liquid fraction, ensures that the finned metal tube comprising the heating element 106 is kept at a temperature that is close to the temperature of the water within element 106, and thus well below the temperature of the hot combustion gases flowing over element 106. Direct-fired, tubular heat exchangers for heating liquids, such as heating element 106, can be compactly and economically produced when they are made using fins on the combustion gas side of the tube wall (i.e., on the outer surface of the tube). The large surface area of the fins compensate for the relatively poor heat transfer characteristics of the combustion gases in comparison to those of the liquid. However, such finned-surface tubular heat exchangers will experience an unacceptably high metal temperature if there is little or no liquid flow through the tube. Such unacceptably high metal temperatures would occur, for example, with only the flow of steam (i.e., water vapor, not liquid water) though the tube.

To limit metal temperature, direct fired heat exchangers for heating dry steam or steam that has very little liquid content are normally made from plain smooth tubes (i.e., not finned). However, these direct-fired heat exchangers, for a comparable thermal duty, can be move expensive and less compact than the finned-tube type for heating liquid fluids or fluids that have a significant liquid fraction. Thus, it is an advantage of the present invention, especially with regard to economy and compactness, to provide fins on heating element 106, and to ensure that the flow through heating element 106 includes some liquid fraction (10% or more) of working fluid throughout its length.

By allowing the working fluid within the system 100 to operate over a wide range of vapor fractions (e.g., 0 to 90%), moreover, the present invention provides for small-scale heat and electric power applications having several important advantages over traditional saturated steam and superheated steam power technologies. First, the system 100 can provide for a long life of the heater 104 by avoiding high metal temperatures in the heating element 106, which typically occurs in direct-fired superheated steam heat exchangers. Another advantage is that there is no need for separation of the vapor fraction (steam) from the boiling liquid, a process that typically requires large free surface areas for the gravity separation of the low density steam from the liquid water as well as water level control devices. Eliminating the steam and liquid water separation requirement allows for substantially reduced physical size of heater 104. Miniaturization of the heat exchange components, including heater 104, generally improves the safety of high pressure systems and also reduces their costs. Another advantage over conventional saturated and superheated steam systems is the simple control over the mechanical power generation rate of the expander 120 by simply varying the speed of the pump 136 while maintaining a fixed burner firing rate and essentially a constant heat production rate. A further advantage concerns the starting and stopping of the system 100. With an expander 120 designed to accommodate a working fluid having a 100% liquid fraction, fluid flow through the heater 104 can be established and confirmed by the controller 140 before firing the burner 108 without having to incorporate complex mechanisms to by-pass the expander 120. Similarly, at shut-down of the burner 108, working fluid, even at a 100% liquid fraction, can continue to be pumped through the expander 120 and condenser 126. This permits nearly all of the residual heat of the working fluid to be usefully transferred into the space or water heating systems of the corresponding home or building, as desired.

Figure 8:
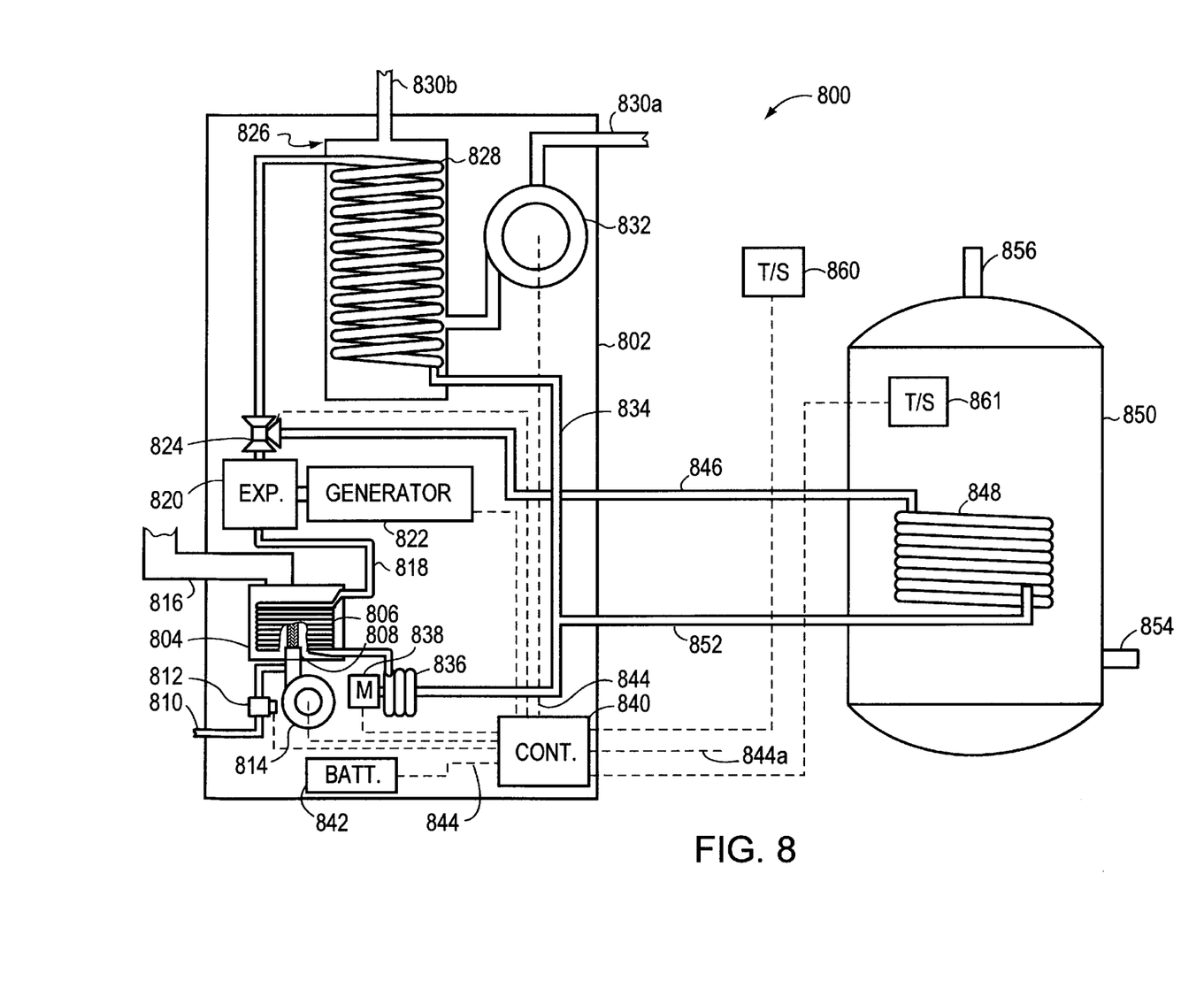
FIG. 8 is a block diagram of another embodiment of a small-scale co-generation system in accordance with the present invention.

FIG. 8 is a block diagram of another small-scale cogeneration system 800. System 800 similarly produces a supply of electrical power as described with reference to FIG. 4, but also provides a supply of hot water (as opposed to forced hot air) for use in heating the corresponding space(s). Specifically, the cogeneration system 800 includes a water heater 804 having a high pressure heating element 806 and a burner 808 extending therein. A gas line 810 provides fuel as regulated by a fuel valve 812 to the burner 808. An electrically powered combustion air fan 814 supplies combustion air to the burner 808 and forces combustion gases through heater 804 and into an exhaust stack 816.

A hot, high-pressure two-phase mixture of working fluid exits the heating element 806 through a supply line 818 and is provided to an expander 820, which is operably coupled to a generator 822. Hot water and/or steam exiting the expander 820 passes through a three-way, electrically operated, valve 824 and is delivered to a heat exchanger 826. The heat exchanger 826 includes a water chamber 830 and a condensing coil 828 disposed therein. The water chamber 830 includes a water inlet line 830*a* for receiving water to be heated and a water outlet line 830*b* which may be connected to a plurality of radiators or other heat transfer devices (not shown) disposed within the space being heated. An electrically driven secondary water pump 832 may be disposed within the water inlet line 830*a* for forcing water through the water chamber 830 and into the corresponding radiators. A series of return water pipes (not shown) convey cooled water exiting the radiators to the water inlet line 830*a*.

Condensate exiting the coil 828 of the heat exchanger 826 flows back to the water heater 804 through a return line 834. A high pressure pump 836, preferably disposed within the return line 834, maintains the water flowing through element 806 of heater 804. Pump 836 is preferably powered by an electric pump motor 838. A controller 840 is operably connected to the generator 822, valve 824, secondary water pump 832, high pressure pump motor 838, combustion air fan 814, fuel valve 812, a thermostat 860 and a battery 842, as shown by dashed lines 844. As described below, controller 840 governs the operation of the cogeneration system 800 and provides electric power to the corresponding home or building via electric outlet line 844*a*. Thermostat 860 is preferably disposed in the space being heated.

During operation, controller 840 activates combustion fan 814 and pump motor 838 and opens the fuel valve 812. As described above with reference to FIG. 4, the controller 840 may obtain the necessary electrical power from the battery 842 or the electric utility grid via line 844*a*. Water heater 804, burner 808 and element 806 are similarly configured to heat the high pressure water to a temperature at or near the boiling point for the corresponding operating pressure (e.g., 200 psia). Hot, high-pressure working fluid having both liquid and vapor fractions exits the heater 804 at supply line 818 and enters the expander 820, causing it to spin and run the generator 822. Again, the expander 820 is coupled to the generator 822 by suitable means, e.g., a drive shaft, belt, etc. Electrical power from the generator 822 is provided to the controller 840.

Hot water and steam exiting the expander 820 is then provided to the heat exchanger 826 and flows through the condensing coil 828 heating the water disposed in water chamber 830. The controller 840, utilizing electric power supplied by the generator 822, also activates the water pump 832, which, in turn, forces cool water into the chamber 830 and drives heated water from the water chamber 830 and into the radiators or other heat transfer devices disposed within the building. Condensate exiting the coil 828 flows back to the water heater 804 via return line 834. Water pump 836 maintains the water flow into the heater 804 at the desired high operating pressure (e.g., 200 psia). It should be understood that the water supply flowing through the water heater 804, expander 820 and coil 828 is completely separate from the water supply flowing through the water chamber 830 and the radiators.

Similar to system 100 of FIG. 1, the cogeneration system 800 may also be configured to heat a domestic supply of water. Specifically, a feed pipe 846 may be connected to the valve 824 so as to divert some or all of the water or steam exiting the expander 820 to a water tank coil 848 disposed in a hot water tank 850. A return pipe 852 transfers condensate exiting the tank coil 848 to the return line 834. Water to be heated is provided to the tank 850 via an inlet 854 and heated water may be drawn out of the tank 850 through an outlet 856. The valve 424, under operation of the controller 840 in response to thermostat 861, preferably adjusts the flow of hot water and steam being provided to the tank coil 848.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A small-scale cogeneration system for providing heat and electrical power, the cogeneration system comprising:
   a pump for providing a supply of high-pressure working fluid;
   a heat exchanger coupled to the pump for receiving the high-pressure working fluid;
   a burner extending at least partially within the heat exchanger so as to heat the high pressure working fluid received therein to produce a two-phase working fluid;
   an expander coupled to the heat exchanger for receiving the two-phase working fluid, the expander configured to extract mechanical energy from the two-phase working fluid by expanding the two-phase working fluid;
   a generator operatively coupled to the expander, the generator being powered by the mechanical energy extracted from the two-phase working fluid;
   a condenser connected to the expander for receiving the expanded two-phase working fluid; and
   means for circulating a space heating fluid in proximity to the condenser so that the space heating fluid is heated as the two-phase working fluid condenses.

2. The small-scale cogeneration system of claim 1 further comprising a controller for governing the operation of the system, the controller coupled to the generator for receiving and monitoring electrical power output from the generator.

3. A small-scale cogeneration system for providing heat and electrical power, the cogeneration system comprising:
   a pump for providing a supply of high-pressure working fluid;
   a heat exchanger coupled to the pump for receiving the high-pressure working fluid;
   a heating component for heating the high-pressure working fluid within the heat exchanger to produce a two-phase working fluid;
   an expander coupled to the heat exchanger for receiving the two-phase working fluid, the expander configured to extract mechanical energy from the two-phase working fluid by expanding the two-phase working fluid;
   a generator operatively coupled to the expander, the generator being powered by the mechanical energy extracted from the two-phase working fluid;
   a condenser connected to the expander for receiving the expanded two-phase working fluid;
   means for circulating a space heating fluid in proximity to the condenser so that the space heating fluid is heated as the two-phase working fluid condenses; and
   a controller for governing the operation of the system, the controller coupled to the generator for receiving and monitoring electrical power output from the generator, wherein
   the pump is a positive-displacement pump having a speed;
   the controller is coupled to the pump to govern the pump's speed; and
   the controller is configured to decrease the pump's speed in order to increase electrical power output.

4. The small-scale cogeneration system of claim 3 wherein the controller is further configured to increase the pump speed in order to decrease electrical power output.

5. The small-scale cogeneration system of claim 4 wherein the working fluid is water having a vapor fraction in the range of 0–90 percent.

6. The small-scale cogeneration system of claim 4 wherein the working fluid has a vapor fraction in the range of 20–80 percent.

7. The small-scale cogeneration system of claim 4 wherein the working fluid has a vapor fraction in the range of 50–70 percent.

8. The small-scale cogeneration system of claim 1 wherein the heater comprises a finned tube for receiving the high-pressure working fluid.

9. A small-scale cogeneration system for providing heat and electrical power, the cogeneration system comprising:
   a pump for providing a supply of high-pressure working fluid;
   a heat exchanger coupled to the pump for receiving the high-pressure working fluid;
   a heating component for heating the high-pressure working fluid within the heat exchanger to produce a two-phase working fluid;
   an expander coupled to the heat exchanger for receiving the two-phase working fluid, the expander configured to extract mechanical energy from the two-phase working fluid by expanding the two-phase working fluid;
   a generator operatively coupled to the expander, the generator being powered by the mechanical energy extracted from the two-phase working fluid;
   a condenser connected to the expander for receiving the expanded two-phase working fluid;
   means for circulating a space heating fluid in proximity to the condenser so that the space heating fluid is heated as the two-phase working fluid condenses; and
   a controller for governing the operation of the system, the controller coupled to the generator for receiving and monitoring electrical power output from the generator, wherein
   the expander is a scroll expander comprising at least one stationary scroll and at least one orbital scroll, the orbital scroll configured to orbit about the stationary scroll.

10. The small-scale cogeneration system of claim 9 wherein the scroll expander further comprises an output shaft that is coupled to the generator and is driven by the orbital scroll.

11. The small-scale cogeneration system of claim 10 wherein the scroll expander further comprises an inlet for receiving the high pressure, liquid or two-phase working fluid and an outlet for discharging the expanded working fluid, and the stationary and orbiting scrolls define a plurality of chambers that are in fluid communication with the inlet and the outlet and in which the two-phase working fluid is expanded.

12. The small-scale cogeneration system of claim 1 wherein the working fluid is water having a vapor fraction in the range of 0–90 percent as it enters the expander.

13. The small-scale cogeneration system of claim 12 wherein:

pump is a positive-displacement pump having a speed, the pump operates, at least in part, on the electrical power produced by the generator, and the amount of electrical power produced by the generator is a function of the pump speed.

14. The small-scale cogeneration system of claim 1 wherein the working fluid is water having a vapor fraction in the range of 0–80 percent as it enters the expander.

15. The small-scale cogeneration system of claim 1 wherein the working fluid is water having a vapor fraction in the range of 0–70 percent as it enters the expander.

16. The small-scale cogeneration system of claim 1 wherein the pump operates, at least in part, on the electrical power produced by the generator.

17. The small-scale cogeneration system of claim 1 wherein the pump provides the working fluid to the heat exchanger at a pressure in excess of 100 pounds per square inch.

18. The small-scale cogeneration system of claim 1 wherein the pump is a positive-displacement pump having a speed, and the amount of electrical power produced by the generator is a function of the speed of the pump.

19. The small-scale cogeneration system of claim 1 wherein the circulating means comprises an air blower configured and arranged to force room air past the condenser, the air blower operating, at least in part, on the electrical power produced by the generator.

20. The small-scale cogeneration system of claim 1 wherein the circulating means comprises at least one secondary water pump configured and arranged to force a supply of secondary water past the condenser, the at least one secondary water pump operating, at least in part, on the electrical energy produced by the generator.

21. The small-scale cogeneration system of claim 1 wherein:

the pump is a positive displacement pump having a speed, the burner has an adjustable firing rate, and by controlling the firing rate of the burner and the speed of the pump, the amount of electrical power produced by the generator is independent of the amount of heat energy produced by the system.

22. The small-scale cogeneration system of claim 21 wherein the burner is one of a two-stage burner and a fully modulating burner.

23. The small-scale cogeneration system of claim 2 wherein the controller is configured to selectively adjust the electrical and heat power output of the system independently of each other.

24. The small-scale cogeneration system of claim 3 wherein the pump provides the working fluid to the heat exchanger at a pressure in excess of 100 pounds per square inch.

25. The small-scale cogeneration system of claim 5 wherein the pump provides the working fluid to the heat exchanger at a pressure in excess of 100 pounds per square inch.

26. A method for cogenerating heat and electrical power from a single system for use in a corresponding space, the method comprising the steps of:

producing a supply of high pressure working fluid;

heating the supply of high pressure working fluid to produce a two-phase working fluid mixture;

extracting mechanical energy from the heated, high pressure, two-phase working fluid mixture;

transferring at least a portion of the latent heat in the working fluid to the corresponding space.

27. The method of claim 26 wherein the step of extracting comprises the step of expanding the heated, high pressure, two-phase working fluid mixture to a lower pressure.

28. The method of claim 27 wherein the step of transferring follows the step of extracting.

29. The method of claim 27 further comprising the step of generating electrical power from the extracted mechanical energy.

30. The method of claim 29 wherein the heat and electrical power produced from the system are independent from each other.

31. The method of claim 26 wherein the working fluid is water having a vapor fraction in the range of 0–90 percent as it enters the expander.

32. The method of claim 26 wherein the working fluid is water having a vapor fraction in the range of 20–80 percent as it enters the expander.

33. The method of claim 26 wherein the working fluid is water having a vapor fraction in the range of 50–70 percent as it enters the expander.

34. The method of claim 26 wherein the working fluid is water having a vapor fraction in the range of 0–80 percent as it enters the expander.

35. The method of claim 26 wherein the working fluid is water having a vapor fraction in the range of 0–70 percent as it enters the expander.

* * * * *